No. 687,687. Patented Nov. 26, 1901.
J. HYSLOP.
APPARATUS FOR SHAPING HEADS OF NAILS.
(Application filed Mar. 26, 1898. Renewed Mar. 15, 1900.)

(No Model.) 5 Sheets—Sheet 1.

Witnesses:
A. C. Harmon
Edward F. Allen

Inventor:
John Hyslop
by Crosby & Gregory
attys.

No. 687,687. Patented Nov. 26, 1901.
J. HYSLOP.
APPARATUS FOR SHAPING HEADS OF NAILS.
(Application filed Mar. 26, 1898. Renewed Mar. 15, 1900.)
(No Model.) 5 Sheets—Sheet 2.

Fig. 2

Witnesses:
A. C. Harmon
Edward F. Allen

Inventor:
John Hyslop
by Crosby Gregory
attys.

No. 687,687. Patented Nov. 26, 1901.
J. HYSLOP.
APPARATUS FOR SHAPING HEADS OF NAILS.
(Application filed Mar. 26, 1898. Renewed Mar. 15, 1900.)

(No Model.) 5 Sheets—Sheet 3.

Witnesses:
A. C. Harmon.
Edward F. Allen.

Inventor:
John Hyslop
by Crosby Gregory.
Attys

No. 687,687. Patented Nov. 26, 1901.
J. HYSLOP.
APPARATUS FOR SHAPING HEADS OF NAILS.
(Application filed Mar. 26, 1898. Renewed Mar. 15, 1900.)
(No Model.) 5 Sheets—Sheet 4.

No. 687,687. Patented Nov. 26, 1901.
J. HYSLOP.
APPARATUS FOR SHAPING HEADS OF NAILS.
(Application filed Mar. 26, 1898. Renewed Mar. 15, 1900.)
(No Model.) 5 Sheets—Sheet 5.

Witnesses: Inventor:
A. C. Harmon John Hyslop
Edward F. Allen. by Crosby Gregory.
Attys.

THE NORRIS PETERS CO., PHOTO-LITHO., WASHINGTON, D. C.

UNITED STATES PATENT OFFICE.

JOHN HYSLOP, OF ABINGTON, MASSACHUSETTS, ASSIGNOR, BY MESNE ASSIGNMENTS, TO THE UNITED SHOE MACHINERY COMPANY, A CORPORATION OF NEW JERSEY.

APPARATUS FOR SHAPING HEADS OF NAILS.

SPECIFICATION forming part of Letters Patent No. 687,687, dated November 26, 1901.

Application filed March 26, 1898. Renewed March 15, 1900. Serial No. 8,857. (No model.)

*To all whom it may concern:*

Be it known that I, JOHN HYSLOP, of Abington, county of Plymouth, State of Massachusetts, have invented an Improvement in Apparatus for Shaping Heads of Nails, of which the following description, in connection with the accompanying drawings, is a specification, like characters on the drawings representing like parts.

Much difficulty is experienced in the use of nailing-machines employing loose nails because of the lack of uniformity in the heads of the nails, such variations in the heads causing lack of uniformity in the appearance of the work and also materially interfering with the proper delivery of the nails to be driven one by one. Many experiments have been made to overcome this difficulty arising from the variation in the heads of the nails.

I have devised an apparatus through which the loose nails to be used in nailing-machines for boot and shoe and like work may be passed preparatory to putting them into the hopper of the usual nailing-machine.

My apparatus has been especially devised to shear and shape the heads of the nails so that they are all left uniform in size and shape, so that when put into the hopper of the nailing-machine or the raceway of the nailing-machine they will feed uniformly and may be taken off without difficulty, and the work done will be uniform in appearance.

My improved machine contains a hopper to receive the nails in bulk, they being fed therefrom into a suitable raceway having a slot in which the bodies of the nails hang supported by their heads lying on the top of the raceway. On the arrival of a nail at the end of the raceway its head is permitted to pass onto a lifter, which lifts the nail above the level of the remaining nails back of it in the raceway, said nails during such operation being prevented from leaving the raceway by a suitable stop or device coöperating therewith, said device being located at the end of the raceway. A nail taken from the raceway by the nail-lifter is thereafter acted upon by a transferrer, it removing the nail laterally from the lifter and putting it into a covered notch of a carrier, and the nail having been deposited in said notch the carrier and the transferrer are moved bodily together to place the nail held between them in position in line with an opening in a pair of point centering or directing jaws and in line with a punch and die, and thereafter by a change in the relative positions of said die and punch the point of said nail is made to enter an opening in said jaws and also a hole in the top of said die, said hole being of the shape it is desired to give to the head of the nail. During this change in the relative positions of said die and punch, the body of the nail having entered the opening of the said directing-jaws and the opening in the die, the transferrer and carrier, yet holding said nail with its head under the punch, are separated, leaving the centering-jaws holding the nail, the point of the nail standing in the opening of the die, said dies and jaws continuing their upward movement to thereby put the head of the nail substantially against the punch, at which time the centering-jaws are opened, letting the die strike the under side of the head of the nail, and immediately thereafter the punch strikes the upper side of the head of the nail, so that in the continued upward movement of the die, the centering-jaws being opened, the punch acts on the head of the nail and forces the said nail through the opening of the die. The nails, with their heads sheared to shape, drop one by one from the apparatus through a suitable chute or conductor into a receptacle placed for the purpose.

Fig. 3$^a$ shows the upper end of the slide D with all the parts carried by it removed. Fig. 4 is an enlarged detail showing the carrier and centering-jaws, anvil-die, and a part of the lower end of the head of the machine. Figs. 5 and 6 show the same devices, but in different operating positions. Fig. 7 shows one side of the nail-lifter. Fig. 7$^a$ is an opposite side view of the lifter $h'$. Fig. 8 shows the anvil-die and its holder.

Fig. 8ª shows one of the blocks having the ears to support the head of the nail detached from the lifter. Fig. 9 is a section in the dotted line $x$, Fig. 4, looking at the centering-jaws and the anvil-die. Fig. 10 shows the acting end of the nail-carrier.

The framework consists chiefly of a column A, carrying a head A', provided with suitable cam-shaft $A^2$, having a balance-wheel $A^3$ and suitable fast and loose pulleys $A^4$ and $A^5$. The hopper L, rotated by the belt 52 from the main shaft $A^2$ and the inclined slotted raceway N to conduct the said nails into position to be taken therefrom one at a time, as will be described, are substantially the same as illustrated in United States Patent No. 467,104, heretofore granted to me, and dated January 12, 1892, so said devices need not be herein further described.

The cam-shaft $A^2$ has fast on it a suitable cam hub or hubs provided with suitable cam-grooves, as B C. The cam-groove C receives in it a roller or other stud carried at one end of a lever C', pivoted at $C^2$ on the head, the upper end of said lever having joined to it a link $C^3$, in turn joined to the upper end of a lever $C^4$, provided at its lower end with the transferrer $a$, said lever $C^4$ being pivoted at $a'$. The cam-groove B receives in it a roller or other stud of a lever B', pivoted at $B^2$ on the framework, the opposite end of said lever being joined by a link $B^3$, in turn joined to the upper end of a lever $B^4$, provided at its lower end with a carrier $b$ to be described, said carrier consisting, essentially, of a finger or plate having a notch at $b'$ and a groove at $b^2$, the top of the notch being covered by a lip $b^3$, the carrier being fastened to the lever $B^4$ by a suitable set-screw $b^5$. The rotation of the cam-shaft $A^2$ causes the transferrer and the carrier to be moved toward and from each other at the proper times, as will be described.

Figure 1:
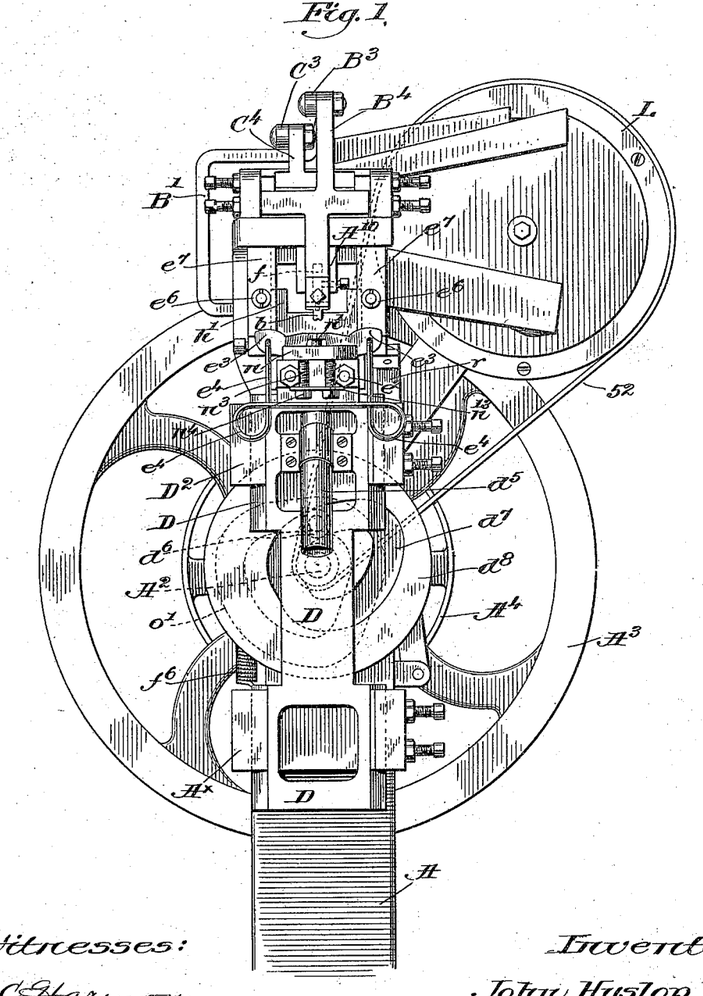
Figure 1 in front elevation shows an apparatus for shaping nail-heads, said apparatus embodying my invention.
Figure 2:
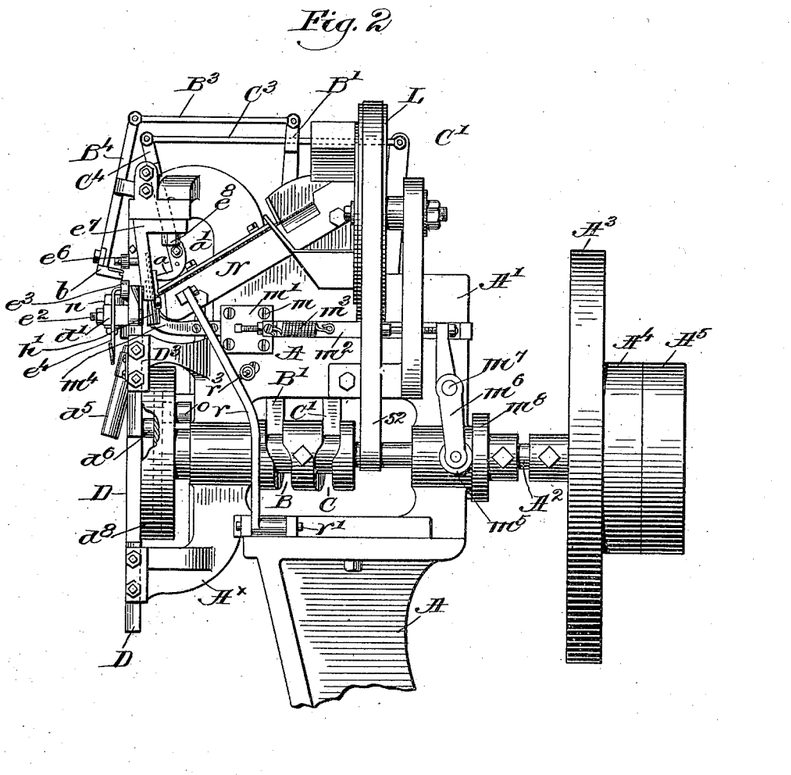
Fig. 2 is a right-hand side elevation of the said machine, but on a smaller scale.
Figure 3:
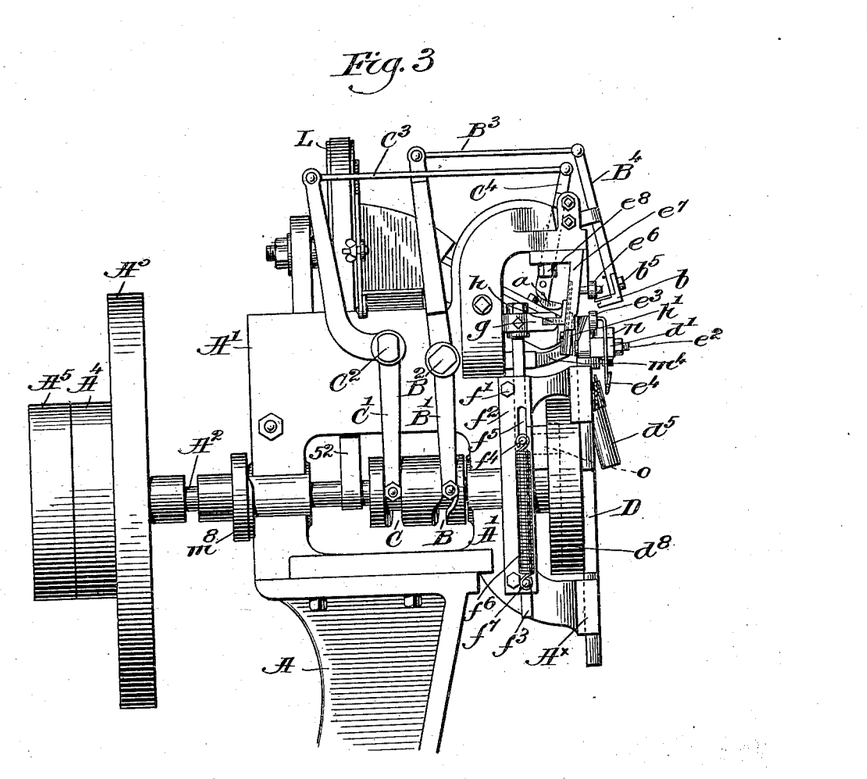
Fig. 3 is a left-hand side elevation thereof.
Figure 3A:
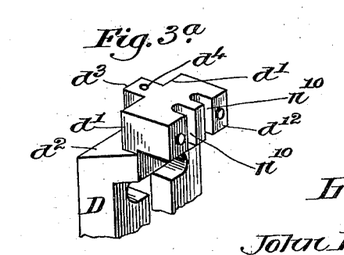
Figures 4, 5, 6, 7, 7A, 8, 8A, 9, 10:
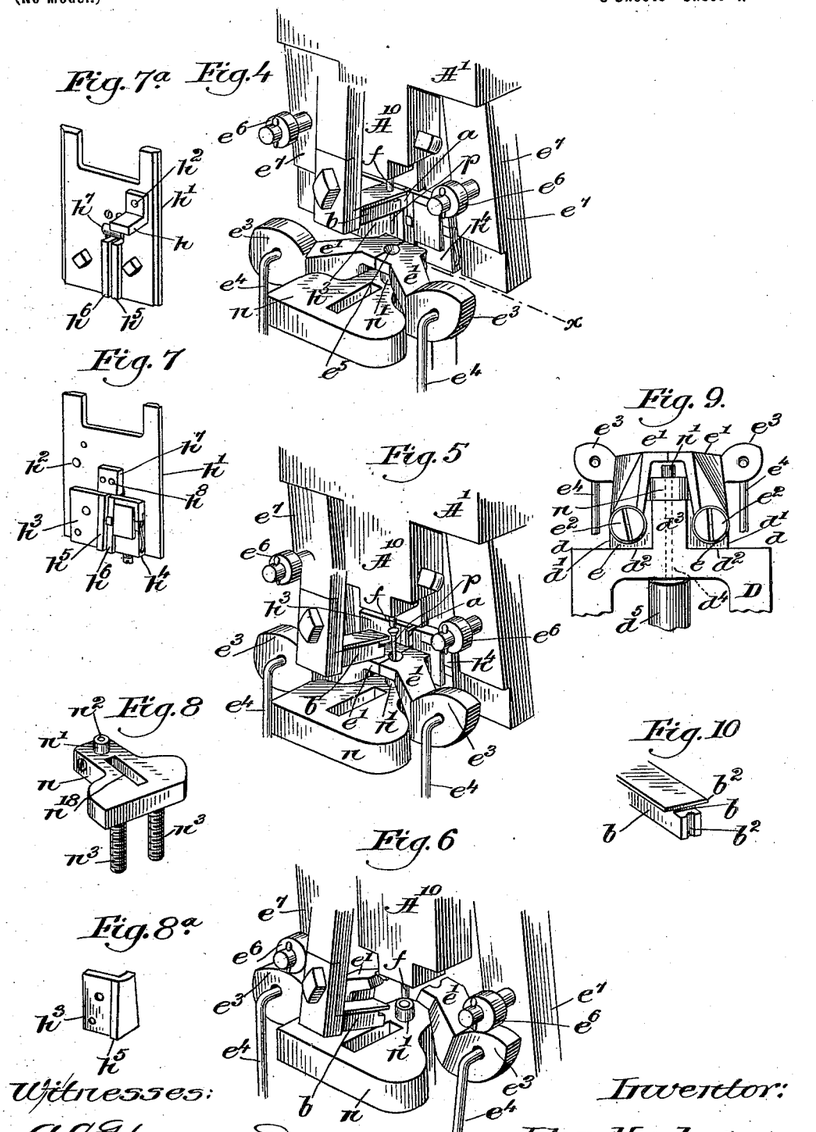
Figure 15:
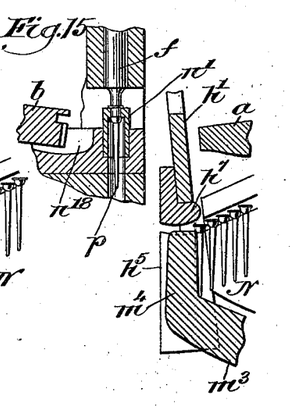

The head of the machine is provided with suitable dovetailed guides $A^\times$ and $D^2$, said guides receiving suitable dovetailed parts of a slide D, carrying the anvil-die and centering-jaws to be described. This slide D, which constitutes in practice a die-carrier, has its upper end reduced in width by cutting the same back from the corners $d$, Fig. 3ª, to the upright edges $d'$, and the upper end of the die is then further reduced by cutting away a portion of the upright, leaving notches at $d^2$, said notches being at each side of a projection $d^3$, which constitutes the extreme upper end of the slide D, said extreme upper end having made through it a suitable hole, as $d^4$, through which the nails, having their heads properly sheared, pass on their way into the delivery-tube $d^5$, which leads the finished nails from the apparatus. The slide D may be reciprocated vertically by or through a roller or other stud $d^6$, connected with said slide and shown in dotted lines in Fig. 1 and full lines in Fig. 2, said roller entering a cam-groove $d^7$ in the face of a cam-disk $d^8$, fast on the main shaft $A^2$. The notches $d^2$ in the slide receive the lower ends $e$ of the movable nail-centering jaws $e'$, there being two such jaws, each being herein represented as pivoted on a suitable stud-screw $e^2$, inserted in a threaded hole made in the upper end of the slide D at its rear side (see Fig. 9) above the shoulders at the bottom of said notches. Each of these jaws has an ear, as $e^3$, provided with a suitable hole, in which is entered one end of a spring $e^4$, said spring (best shown in Fig. 1) normally acting to keep the faces of said jaws normally closed, as best shown in Figs. 4 and 5, the said faces being provided each with a notch, as $e^5$, the two notches together forming a passage-way for the body of the nail, the said jaws when open permitting the head of the nail to pass between them. These jaws are opened each time the slide D is elevated, for at that time the ears $e^3$ meet the roller or other projection $e^6$, connected with a stand $e^7$, suitably attached to the head A' by suitable bolts, as $e^8$. (See Fig. 2.) The head A' has a depending projection $A^{10}$, the extreme lower portion of which is somewhat reduced in size and is suitably bored to receive the shank of a punch $f$. The head has fastened to it at its left-hand side, as herein shown, by screws $f'$ a suitable guideway $f^2$, in which is placed a slide-rod $f^3$, said slide-rod having a suitable stud $f^4$, which is extended out through a slot $f^5$ in said guideway, said stud having fast upon it a suitable spiral or other spring $f^6$, attached to a stud $f^7$ on the guideway or other fixed part of the frame, said spring normally acting to keep the slide-bar $f^8$ down in its lowest position. The upper end of this slide-bar is provided with a projection $g$, slotted to embrace an ear $h$, connected to the lifter $h'$, (shown as detached in Figs. 7 and 7ª,) the said ear being attached to said lifter by a suitable screw $h^2$, inserted in a tapped hole of said lifter, said ear being located at that side of the lifter next the end of the raceway. The lifter at its lower end is slotted or cut away, as best shown in Fig. 7ª, and in said slot I secure two blocks $h^3$ $h^4$, said blocks each having a like tongue, as $h^5$ $h^6$, one of said blocks and its tongue being shown at Fig. 8ª. Said tongues are extended from the front side of said lifter through the slot made therein, and the tops of said tongues, as shown much enlarged in Figs. 11 to 15, are somewhat concaved in shape, so that when said lifter is in its lowest position, as represented in Fig. 15, the upper edges of said ears will stand as a continuation of the top edges of the raceway N, so that the head of a nail may pass from the end of said raceway upon the upper ends of said ears. At this time the nail-head passes under the lower end of a lug $h^7$, fastened to the carrier $h'$ at its front side by suitable screws $h^8$, the lower end of said lug being preferably convexed to facilitate the passage of the heads of the nails, the shanks of which enter the slit or passage between the lower end of said lug and the tops of said ears.

The head A has, as herein shown, connected to its right-hand side by suitable screws $m$ a guide plate or box $m'$, which receives in it a slide-bar $m^2$, said slide-bar having connected to it in suitable manner a suitable spring, as $m^3$, which normally acts to keep the said slide-bar held in its forward position, and with the upturned nail-stop $m^4$ of said slide-bar in proper position with relation to the end of the raceway, as shown in Fig. 15, to let a nail pass from the end of the raceway onto the tops of the ears of the lifter, the shank of said nail meeting the nail-stop $m^4$, as in said figure. This spring $m^3$ also serves to cause the roller or other stud $m^5$, carried by the lever $m^6$, pivoted at $m^7$ and connected with said slide $m^2$ in an adjustable manner against a face-cam $m^8$, fast on the shaft $A^2$, the said cam in the rotation of said shaft causing the slide-bar $m^2$ to be moved back and forth, as will be described.

The extreme upper end $d^3$ of the slide D receives upon it and sustains one end of a block $n$, in which is provided a suitable recess for the reception of the anvil-die $n'$, held in place by a suitable set-screw $n^\times$, said die having a central opening $n^2$ in its upper end, which will be of the shape which it is desired to give to the finished heads of the nails. This plate $n$ has depending from its lower side two suitable threaded rods $n^3$, which are inserted through slots $n^{10}$ in the projecting portion $d^{12}$ at the upper end of the slide D, said threaded rods being passed through a thin plate $n^{13}$, and thereafter they each receive a suitable nut, as $n^4$, which serves to confine the plate and its anvil-die firmly in position.

Figures 11, 16, 17:
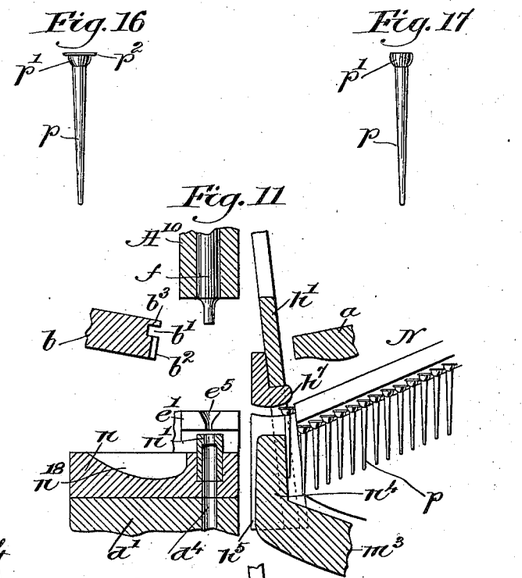
Figs. 11 to 15 show views of the operating parts in different positions, to thus illustrate, substantially, a cycle of operations.
Fig. 16 shows a nail in the condition in which it is put into the hopper to have its head sheared.
Fig. 17 shows a nail with its head sheared.

Assuming that a nail has passed from the raceway upon the upper ends of the ears referred to carried by the lifter, as in Fig. 15, the lifter will be elevated by or through the slide-rod $f^3$, it having a suitable roller or other stud, as $o$, which enters a groove $o'$, shown by dotted lines in the rear side of the cam $d^8$, and as said lifter is elevated it will take the nail with it, as represented in Fig. 11, and at the same time the slide D will descend from the position Fig. 15 into its normal position Fig. 11. The lifter will be raised until the upper ends of the ears come substantially opposite the opening $b'$ of the carrier, said carrier in the meantime being moved to the right, viewing Figs. 15 and 11, into the position shown in Fig. 12, it passing under the punch $f$. On the arrival of the carrier and the lifter in the position shown in Fig. 12 the transferrer $a$, it having a narrow end capable of passing in between the slot left between the two ears $h^5$ and $h^6$, will be moved to the left, viewing Fig. 12, and will strike the body of the nail suspended on the upper ends of the said ears, and will push the said nail laterally off from the opposite ends of said ears in under the lip $h^7$, causing the head of said nail to enter the notch $b'$ and the body of the nail the slot $b^2$ in the carrier, and the movement of the transferrer and the carrier will be continued uniformly together to the left, as in Fig. 13, until the point of the nail so clamped and held between the transferrer and carrier is placed over the opening $e^5$ in the ends of the centering-jaws $e'$, as in Fig. 13. Now at this time the slide D will be started on its upward movement, causing the nail-centering jaws to pass over the shank of the nail, and the point of the nail will also be made in this upward movement of the slide to enter the hole $n^2$ in the die $n'$, and about as the upper side of the jaws $e'$ arrive at the lower sides of the transferrer and carrier said transferrer and carrier are separated substantially into the positions Figs. 5 and 14, and the jaws continue in their upward movement, grasping frictionally between them the body of the nail, the point of the nail lying in the hole in the die. The slide D continues to rise until the jaws arrive substantially opposite the lower end of the punch, at which time the parts $e^3$ of said jaws meet the projections $e^6$, which are to open the jaws, and immediately thereafter the head of the nail is forced against the punch, and in the continued rise of the die the head of the nail against said punch is forced through the die-opening, thus shearing the said head to the desired shape.

Referring to Fig. 16, $p$ represents the body of a nail, and $p'$ its head, the said head having at its extreme upper end a fin or projection $p^2$. These nails are made by machinery, and the heads are formed by cutting or upsetting the metal, and of course they are not all left exactly uniform in shape, so by passing this nail through the apparatus herein described the fin $p^2$ may be removed, leaving the body and head as substantially represented in Fig. 17, and this head may be either circular or of other shape, according to the shape of the opening in the top of the die $n'$. This invention is not limited to the particular taper or quantity of metal in the head part, (marked $p'$,) although the shape herein represented is a preferable one for nails of the class to be used in nailing-machines.

Figure 12:
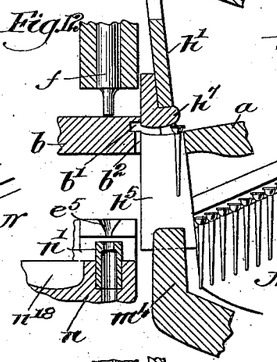
Figure 13:
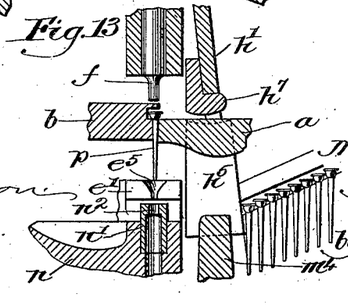
Figure 14:
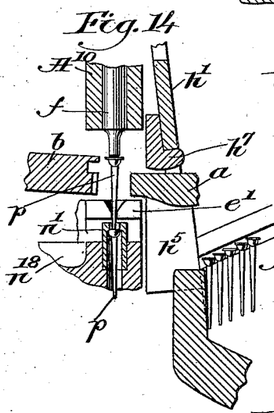

When the lifter rises from the position Fig. 15 into the positions Figs. 11, 12, and 13, the inclined side edges of the ears connected with the lifter, acting on the endmost nail of the series of nails in the raceway, crowd it and the nails behind it back slightly in the raceway, thus adjusting the nails correctly in the raceway, said edges also preventing any nails leaving the raceway, for the reason that the slot between the two lugs $h^5$ and $h^6$ is narrower than the diameter of the heads of the nails. However, as the lifter commences to descend from the position Fig. 13 into the position Fig. 14 the nail-stop $m^4$ is moved slightly to the right from the position Fig. 13 into the position Fig. 14, it acting upon the endmost nail of the raceway and pushing it and its fellow nails next to it farther slightly to the right and slightly up the raceway, said stop keeping the said nails in such position until the lifter has again arrived into the position Fig. 15, when the said stop is again moved to the left, letting the endmost nail follow it and pass onto the tops of the ears $h^5$ and $h^6$. Fig. 15 shows the anvil or die in its highest position, the punch having acted upon the head of the nail, the latter being shown as leaving the opening in the die, leaving the shearing on the top of the die. Now as the lifter arrives again in its position Fig. 15 the slide D is lowered into its normal position, Fig. 11, and the lifter is again elevated, as before described.

By imparting to the slide $m^3$, having the nail-stop $m^4$, a to-and-fro movement I am better enabled to control the delivery of the nails from the raceway than were the said stop fixed in the lower end of the raceway, as provided for in United States Patent No. 472,638, heretofore granted to me and dated April 12, 1892. That patent shows a lifter which closely resembles and is substantially the same in construction and operation, so far as it receives upon it the heads of the nails and lifts them, as the lifter hereinbefore referred to. That patent, however, did not comprise or contain any devices whatever for shearing the head of the nail.

This invention is not limited to the precise shape shown for the transferrer or the nail-carrier or the nail-stop so far as they are combined and coöperate with the punch and die, nor is this invention limited to the exact shape for the jaws for centering the nail between the transferrer and carrier and the opening in the die, and instead any other usual or suitable devices may be employed.

The plate or block $n$, carrying the die $n'$, has a notch $n^{18}$, (see Fig. 8,) in which enters the lower end of the carrier $b$, as in Fig. 15, when the slide D arrives in its highest position.

The raceway is jarred or vibrated, so as to enable the nails to slide freely down it, by or through a suitable hammer, the handle $r$ of which is pivoted at $r'$, a suitable cam on the main shaft $A^2$ operating said handle in one direction, a spring $r^3$ operating it in the opposite direction.

Having described my invention, what I claim, and desire to secure by Letters Patent, is—

1. In a machine for trimming the heads of nails, a raceway to receive and conduct the nails, a lifter located at the end thereof, and adapted to receive upon it the endmost nail in the raceway, means to change the relative positions of said lifter and raceway to detach the nails therefrom; a punch, a die, and means to take the nail from the lifter and hold the same in line with the opening of said die to be acted upon by said punch, the latter forcing the nail through said die to shape its head to the required form, substantially as described.

2. A raceway to support a series of nails, a lifter located at the end of said raceway, and having a surface upon which may pass the endmost nail at the end of the series of nails in said raceway, and means to actuate said lifter, combined with a stop located at the end of said raceway, and means including a cam to automatically move the said stop to and fro whereby said stop is made to act intermittingly against the endmost nail in the raceway and force it and those behind it back somewhat upon the raceway, substantially as described.

3. In a machine for shaping the heads of nails, a lifter to receive upon it and support the head of a nail to be sheared, means to actuate said lifter, a transferrer, a carrier, means to move said transferrer and carrier to remove the nail from the said lifter, combined with a punch, and a die, and means to change the relative positions of said die and punch, whereby the nail discharged from between the said transferrer and carrier may be acted upon by the punch and forced through the opening of said die, thereby shaping its head, substantially as described.

4. In a machine of the class described, a lifter or device to sustain nails singly by their heads, a transferrer, and a carrier notched to receive the nail from the lifter, combined with a punch, a die, nail-directing jaws interposed between said punch and die, and means to change the positions of said die and jaws with relation to said punch, and to open the said jaws to permit the head of the nail to pass through the same and meet the top of the die, substantially as described.

5. In a machine of the class described, a raceway, a lifter at the end of said raceway, means to move said lifter to pick a nail vertically off from said raceway, a transferrer located in a plane above said raceway, a carrier having a recess for the head of said nail, and a notch for its body, combined with means to move said transferrer and carrier to effect the transfer of the nail from the lifter into the notch and recess of the carrier, substantially as described.

6. In a machine of the class described, a punch, and a die; a slide as D, guides in which it may move, a pair of jaws mounted on said slide, a spring to normally close said jaws, combined with means to elevate said slide and put the head of the nail grasped by said jaws against said punch, and with means to thereafter open said jaws as the said slide arrives in its highest position, substantially as described.

7. The slide D provided at its upper end with a die-holder having a die provided with a hole, the shape of the hole determining the shape of the head of the nail, centering-jaws mounted on said slide and located just above said die and having recesses to receive in it the body of the nail, the head of which is to be sheared, combined with a punch, means to lift said slide and die and to open said jaws, whereby the punch may pass through said jaws and act upon the head of the nail and force it through said die, substantially as described.

8. In a machine of the class described, a raceway to present a series of nails, a lifter located at the end of said raceway to detach the said nails one by one vertically from the end of said raceway, a die having an opening to give shape to the head of the nail; centering-jaws having their edges meeting above the opening of said die, means to take a nail from said lifting device, and insure the entrance of the point of the nail into the jaws, and the opening in the die, combined with a die-holder, and a discharging-tube as $d^5$, to receive the nails as they are forced through the said die, substantially as described.

9. In a machine for shearing the heads of nails, the following instrumentalities, viz: a raceway; a lifter at the end of said raceway, means to actuate it to take a nail vertically from the end of said raceway; a transferrer located in a plane above said raceway; a carrier having a recess for the head of said nail, and a notch for said body; means to move said transferrer and carrier toward and from the other in suitable time and order to transfer a nail from the said lifter into the notch and recess of the carrier, and to thereafter freely release said nail, a punch; a slide having mounted upon it a die-holder and die; centering-jaws carried by said slide, and means to move said die vertically, to operate, substantially as described.

10. A lifter or device to sustain nails singly by their heads, combined with a transferrer, and with a carrier notched to receive the head of the nail, and means to move said transferrer to dislodge the nail from said lifter or device, and put it into the notch of the carrier, substantially as described.

11. A lifter or device to sustain nails singly by their heads, combined with a transferrer, and with a carrier notched to receive the head of the nail, and means to move said transferrer to dislodge the nail from said lifter or device, and put it into the notch of the carrier, and means to thereafter separate said transferrer and carrier to permit the nail held between them to be discharged therefrom, substantially as described.

12. The herein-described nail-carrier, consisting of a finger or plate provided with a covered notch for the reception of the head of a nail, and with a slot for the body of the nail, combined with means to put a nail into said notch and slot, substantially as described.

13. In a machine for punching and shearing the heads of nails, a hopper or reservoir to receive the nails in bulk, means to move said hopper; a raceway to receive said nails, means to take the nails singly from the lower end of said raceway; and a punch, combined with a slide provided with a die-holder and die, and means to move said slide to cause said punch to act upon the head of a nail and force it through the die, substantially as described.

14. A machine for shaping the heads of nails comprising a punch and die, a raceway, and means intermediate the delivery end of said raceway and said punch and die to lift said nails singly from the delivery end of the raceway and put them in position for the action of the punch and die.

15. A machine for shaping the heads of nails comprising a punch and die, a raceway, and a lifter located at the delivery end of the raceway and adapted to take said nails singly from the delivery end of the raceway that their heads may be shaped by the punch and die.

16. A raceway, a lifter to take a nail therefrom, a carrier shaped to receive and position the head and body of the nail, and means to transfer the nail from the lifter into the carrier.

17. A raceway, a punch and die centering jaws, a lifter located between said raceway and jaws and adapted to take a nail from said raceway, and means to take said nail from said lifter and put it in position to be centered by said jaws, preparatory to the action of said punch to force the nails through said die.

18. A raceway, centering-jaws, a lifter located between said raceway and jaws and adapted to take a nail from said raceway, and means to take said nail from said lifter and put it in position to be centered by said jaws, and means to lift said jaws that they may embrace the body of and act as a guide for the shank of the nail when the head end thereof is given up by the means employed to take it from the lifter.

19. A raceway, centering-jaws, a lifter located between said raceway and jaws and adapted to take a nail from said raceway, and means to take said nail from said lifter and put it in position to be centered by said jaws, means to lift said jaws that they may embrace the body of and act as a guide for the shank of the nail when the head end thereof is given up by the means employed to take it from the lifter, a die, and means to open said jaws that the nail guided by it may enter said die.

20. In a machine for shearing the heads of nails, a die, means to sustain it, normally-closed notched jaws occupying a position above said die, a punch, means to present nails singly to said jaws, and means to open said jaws that the punch may meet the head of and drive a nail through the die thereby shaping the head thereof.

21. A lifter to take a nail from a raceway, a transferrer, and a carrier to take a nail from said lifter and carry it in position to be discharged, and means to thereafter actuate said transferrer and carrier to effect the discharge therefrom of the nail held thereby.

22. In a machine of the class described, a slide, its notched block and die, normally-closed centering-jaws located above said die, a punch, devices to deliver nails singly to said jaws, and means to effect the opening of said jaws as the punch acts to drive a nail through the die.

23. A raceway, a lifter located at the end thereof and provided with backwardly-inclined ears to act on and crowd back the nails at the end of the raceway as the lifter is being moved to detach the nails from the raceway.

24. A raceway, combined with a lifter composed of a slotted plate provided with ears shaped at their upper ends to receive the endmost nail of the series of nails on the raceway, and a convexed lug located a short distance above the upper end of said lip.

25. A raceway slotted to receive the bodies of and support a series of nails, a centrally-movable lifter located at the end of said raceway, a nail-stop located between the sides of said raceway, and means to operate said nail-stop intermittingly, it entering the space in the lifter in advance of the nail to be taken from the raceway and thereafter leaving said space and acting against the then-endmost nail of the series at the end of the raceway and pushing said nails back somewhat laterally preparatory to the descent of the lifter into its normal position.

26. A raceway composed of plates presenting a groove or way for the bodies of nails, a nail-stop located at the delivery end of said raceway and entering the groove thereof, and means to reciprocate said stop in said groove in the direction of the length of said raceway at each operation of the machine.

27. In a machine of the class described, a lifter to take nails singly from a raceway, a carrier notched to receive the said nails, means to move said carrier to and fro, and a transferrer, and means to move it to coöperate with said transferrer in taking a nail from said lifter and carrying it aside in position to be acted upon by a punch and die.

28. A raceway combined with a lifter composed of a slotted plate provided with ears shaped at their upper ends to receive the endmost nail of the series of nails on the raceway, and an intermittingly-moving nail-stop to act on and push backwardly and upwardly on said raceway the nails at the lower end thereof preparatory to the descent of the lifter into position to again receive a nail.

29. A vertically-movable slide carrying a plate provided with an upwardly-projecting die, a raceway, a pawl located at a distance from the end of said raceway, means to detach nails singly from said raceway, a carrier and a transferrer to put said nails in the line of movement of said punch, centering means located between said die and punch, and means to separate said carrier and transferrer and said centering means in succession as the punch acts to drive the nails through the die.

In testimony whereof I have signed my name to this specification in the presence of two subscribing witnesses.

JOHN HYSLOP.

Witnesses:
WALTER T. TAYLOR,
GEORGE C. TAYLOR.